United States Patent [19]
Sutherland et al.

[11] Patent Number: 5,594,576
[45] Date of Patent: Jan. 14, 1997

[54] OPTICAL SERIAL BUS INTERFACE

[75] Inventors: Joseph E. Sutherland, Raleigh; Paul M. Matsumura, Carrboro, both of N.C.

[73] Assignee: Alcatel Network Systems, Inc., Richardson, Tex.

[21] Appl. No.: 384,377

[22] Filed: Feb. 3, 1995

Related U.S. Application Data

[63] Continuation of Ser. No. 739,603, Jul. 31, 1991, abandoned.

[51] Int. Cl.$^6$ .............................. H04B 10/20; H04J 14/08
[52] U.S. Cl. .......................... 359/118; 359/137; 359/163
[58] Field of Search .................................... 359/118, 120, 359/121, 125, 137, 158, 164, 163; 370/110.1, 94.1

[56] References Cited

U.S. PATENT DOCUMENTS

| | | | |
|---|---|---|---|
| 4,451,916 | 4/1984 | Casper et al. | 359/113 |
| 4,817,204 | 3/1989 | Jannelli et al. | 359/118 |
| 4,899,142 | 2/1990 | Nakayashiki et al. | 370/85.15 |
| 4,977,593 | 12/1990 | Ballance | 359/158 |
| 4,991,173 | 2/1991 | Krisher | 370/110.1 |
| 5,027,349 | 6/1991 | Thorne | 370/85.1 |
| 5,029,333 | 7/1991 | Graves et al. | 370/58.1 |
| 5,033,044 | 7/1991 | Williams et al. | 370/110.1 |
| 5,054,050 | 10/1991 | Burke et al. | 379/27 |
| 5,060,229 | 10/1991 | Tyrrell et al. | 370/110.1 |
| 5,111,497 | 4/1992 | Bliven et al. | 379/27 |
| 5,134,614 | 7/1992 | Baydar et al. | 370/94.1 |

OTHER PUBLICATIONS

"A Future Switched Video System", J. Gunter, *IEEE LCS Magazine*, Feb. 1990, pp. 66–72.

"A Hybrid Lightwave Transmission System for Subcarrier Multiplexed Video and Digital B–ISDN Services in the Local Loop" C. Lo, *IEEE Journal of Lightwave Technology*, vol. 7, No. 11, Nov. 1989, pp. 1839–1848.

"A High-Quality Switched FM Video System", D. Robinson et al, *IEEE LCS Magazine*, Feb. 1990, pp. 53–59.

"Fiber Optic Analog–Digital Hybrid Signal Transmission Employing Frequency Modulation", K. Sato et al, *IEEE Transactions on Communications*, vol. COM–33, No. 8, May 1985, pp. 433–441.

Primary Examiner—Wellington Chin
Assistant Examiner—Rafael Bacares
Attorney, Agent, or Firm—Ware, Fressola, Van Der Sluys & Adolphson

[57] ABSTRACT

In an optical fiber transmission network, a remote terminal fed by a high-rate optical signal includes an internal electrical link called a serial interface bus carrying 24 DS0 channels. The optical transmission network is extended by converting the SBI baseband signal from electrical to optical and transmitting the SBI optical signal over a distribution fiber to a network unit located in the neighborhood of the subscribers.

5 Claims, 9 Drawing Sheets

*LCX-50/150 CENTRAL OFFICE TERMINAL (COT) FOR ANALOG SWITCH OR TM-50 (OC-1)/ADM-150 (OC-3) FOR DIGITAL SWITCH

NOTE: EACH (RESIDENTIAL) OPTICAL NETWORK UNIT (ONU) SUPPORTS UP TO 8 LIVING UNITS (2 POTS LINES PER LIVING UNIT)

OPTICAL SERIAL BUS INTERFACE

This is a continuation of application Ser. No. 07/739,603, filed on Jul. 31,1991, now abandoned.

CROSS-REFERENCE TO RELATED APPLICATIONS

This application describes an invention which is related to a plurality of inventions covered by the following commonly-assigned and, in some cases, copending U.S. patent applications: Ser. No. 351,861 filed May 12, 1989; Ser. No. 452,291 filed Dec. 15, 1989; Ser. No. 295,887 filed Jan. 11, 1989, now U.S. Pat. No. 5,014,268, issued May 7, 1991; Ser. No. 351,458 filed May 12, 1989 now U.S. Pat. No. 5,060, 229; Ser. No. 451,419 filed Dec. 15, 1989; Ser. No. 451,436 filed Dec. 15, 1989 now U.S. Pat. No. 4,993,019 issued Feb. 12, 1991; Ser. No. 547,383 filed Jul. 3, 1990, now U.S. Pat. No. 5,027,349 issued Jun. 25, 1991; Ser. No. 616,175 filed Nov. 20, 1990; and co-pending applications Ser. No. 07/738, 111 entitled "Switched Video Architecture for an Optical Fiber-to-the-Curb Telecommunications System"; and Ser. No. 07/739,203 entitled "Fiber Optic Link", both filed on Jul. 30, 1991. The disclosures of the above-mentioned patents and patent applications are incorporated herein by reference.

BACKGROUND OF THE INVENTION

1. Field of the Invention

The present invention relates to an optical fiber telecommunications network and more particularly, towards a method and apparatus for extending optical fiber in such a network to the subscriber's neighborhood.

2. Description of the Prior Art

Optical fibers are rapidly becoming the preferred means for transmission in telecommunications networks. The advantages of using optical fibers are well known and are fully accepted as being desirable. Optical fiber transmission provides the potential for exceedingly wide bandwidths which will allow for the future provision of broadband services directly to individual subscribers on a relatively universal basis. Such broadband services may include data transmission; however, there is a broader market for the distribution of video services over the telecommunications network to the vast number of residential subscribers.

In order to achieve the benefits of this broadband capability of optical fibers, it is essential that the fibers be deployed relatively close to the subscriber, as it is difficult to sustain the broadband transmission over great distances using electrical signals. At present, feeder fibers are used to bring telecommunications signals to a Digital Loop Carrier (DLC) Remote Terminal (RT); however, commercially-acceptable methods for providing optical signals closer to the subscriber have not yet been achieved on a reasonably broad basis.

There have been many proposals for providing fiber optic services to residential subscribers in both narrowband and broadband format. Some of these proposals have been described in the Description of the Prior Art set forth in the afore-mentioned co-pending application entitled, "Switched Video Architecture for an Optical Fiber-to-the-Curb Telecommunication System". Various articles have been published describing the advantages of fiber optic systems, and in particular, the advantages of certain types of broadband fiber optic systems.

An article entitled: "A Future Switched Video System" by John R. Gunter, *IEEE LCS Magazine*, February, 1990, at page 66 and following, describes the desirability of providing video services over the telecommunications network. Another article entitled: "A High-Quality Switched FM Video System" by David E. Robinson and David Grubb, III, *IEEE LCS Magazine*, also published February, 1990, at page 53 and following describes a proposed system architecture wherein the various video channels are frequency multiplexed onto a carrier; however, the carrier uses wavelength division multiplexing for upstream and downstream transmissions.

Other articles describing the simultaneous transmission of narrowband and broadband signals are as follows: "A Hybrid Lightwave Transmission System for Subcarrier Multiplexed Video and Digital B-ISDN Services in the Local Loop" by Charles N. Lo, *Journal of Lightwave Technology*, Vol. 7, No. 11, November 1989, pp. 1839–1848; and "Fiber Optic Analog-Digital Hybrid Signal Transmission Employing Frequency Modulation", by K. Sato et al, *IEEE Transactions on Communications*, Vol. COM-33, No. 5, May 1985, pp. 433–441.

SUMMARY OF THE INVENTION

The present invention contemplates a method and apparatus for providing optical fiber transmission directly to the neighborhood of the subscriber.

The afore-mentioned co-pending application entitled, "Switched Video Architecture for an Optical Fiber-to-the-Curb Telecommunication System" discloses a truly integrated fiber optic telecommunications system providing switched video and standard narrowband telephone services. The system is integrated, in that it transmits video services on the same fiber as the narrowband services and uses common equipment to support both services.

In said system, the feeder fiber from a Central Office (CO) services a Remote Terminal (RT) over a single fiber pair (Tx and Rx) operating at a SONET OC-1 (51.84 Mb/s) or OC-3 (155.52 Mb/s) data rate. The RT includes Loop Carrier cross-Connect (LCX) hardware for cross-connecting and distributing DS0 channels. The system uses a star distribution network where optical fibers radiate from the RT to active Optical Network Units (ONU) located in residential areas. Each residential ONU serves up to eight living units, with three DS0 (64 Kb/s) channels each. For residential applications, two channels are typically used for Plain Old Telephone Service (POTS), with the third channel reserved for future applications, such as the D-channel for an Integrated Services Digital Network (ISDN).

The system provides a Loop Carrier Cross-connect-Fiber-To-The-Curb (LCX-FTC) system, which is an advanced SONET-compliant Digital Loop Carrier system that offers telephone companies immediate and future access to narrowband and broadband functionality. The system is designed around a family of SONET access products produced and sold by Alcatel NA Network Systems Corp., the assignee of the present invention, under product designations LCX-50 and LCX-150. The LCX-FTC system utilizes optical fibers instead of metallic lines in the local loop. The fiber-to-the-curb components of the system are built upon the LCX hardware and software platforms of Alcatel to provide an easy migration to the FTC services. The system is modular by design and can be configured to accommodate many different applications.

The above-mentioned patents and patent applications which have been cross-referenced as related inventions fully describe the members of the family of access products upon which the present invention is based. Accordingly, the teachings included in these patents and patent applications are incorporated herein by reference.

The present invention contemplates the extending of fiber with its tremendous bandwidth capacity closer to the end user than presently achieved with fiber feeders to remote terminals. The architecture of Alcatel's SONET Access Products, particularly the LCX, lends itself to such fiber extension.

In the existing LCX design, 24 DS0 groups of subscriber line circuits are connected to the LCX core by an internal proprietary electrical link called the Serial Bus Interface (SBI) to be described in detail below. This four-wire link was originally designed for short-range electrical communications between shelves and racks at a single site. With the addition of electro-optical transceivers, the baseband SBI signal can be used to relocate the line circuit functions of an LCX RT to optical network units in subscriber neighborhoods via distribution fiber in a star-typology. Thus, the implementation of a fiber-to-the-curb system with minimum change to the LCX architecture is quite possible.

The adoption of the Synchronized Optical Network standard (SONET) within the United States and elsewhere (American National Standards Institute Standard T1.105-1988 entitled "Digital Hierarchy Optical Interface Rates and Formats Specification"), defines a standard for the transfer of information by means of optical fiber. With such a standard there is a need for transferring information associated with lower speed telephony standards such as the digital signal standard, or DS-X standard (where "X" is an integer, such as 0, 1, 2 and 3). The DS-X standard is commonly used in telephony, with DS-0 directed to channels that operate at 64 kilobits per second (kbits/sec), DS-1 directed to channels operating at 1.544 megabits/second (mbits/sec), DS-2 operating at 6.312 mbits/sec, and DS-3 operating at 44.736 mbits/sec. With the DS-X standard, each channel comprises 8 bits of data while the signalling and control information associated with such a channel is typically inserted at the least significant bit of designated frames of that channel in what is commonly referred to as a "rob-bit" method. This method was patented by the American Telephone and Telegraph Corporation (ATT) and is widely used in the United States and Canada.

In Europe, the signalling and control information associated with a digital channel is typically presented in a designated repeating frame of that channel so that the data is not compromised by the signalling and control information.

The SONET standard defines the rates and formats for optical interfaces with the basic signal broken into two main portions, one portion for what is called Transport Overhead and one portion for payload. The Transport Overhead comprises Section Overhead and Line Overhead while the payload contains Path Overhead and payload data. The payload data may be a DS-3 type signal or lower speed DS-0, DS-1C, or DS-2 signals presented in what is called a Virtual Tributary (VT). It is within this payload data that the signalling and control information of the channels is maintained for whatever signalling format is used (e.g. AB or ABCD (ESF) signalling). In SONET, such signalling and control information is stored in a prescribed manner.

A serial transport frame format as shown in FIG. 7 defines a frame for the transfer of 32 channels of information, each channel comprising 16 bits. Each frame is typically generated at a frequency of 4.096 megahertz.

The first channel of each frame preferably contains a synchronization word while the last channel may optionally contain general maintenance or control information. This maintenance and control information can provide codes associated with looping so as to isolate faults as well as to control communications between modules connected at respective ends of a serial bus (link) associated with the serial transport frame format. Regardless of the channel, a first portion of the channel contains data while a second portion of the same channel contains associated control information. Such control information may include timing information associated with that channel of data.

When the channels contain DS-0 data, the first 8 bits of each 16 bit channel contains the actual DS-0 data (such as voice data) with the remaining bits containing the signalling information (e.g. A, B or A, B, C, D information) and timing information associated with that DS-0 channel, as well as channel parity information.

In order to transfer this internal information in a fast, reliable, and cost-effective manner a serial transport frame method has been devised for sending such information so that both the data and the associated channel control information (e.g. signalling and timing information) are transparently conveyed between any two modules. The serial transport frame format further provides for the transfer of such information in a frame format wherein frame synchronization information is provided in a standardized form. The frame format also provides for the transfer of general control information in a standardized form. This general control information is also in the form of data and associated channel control information, the latter potentially including data valid (V) and interrupt (I) bits and addressing information. Each control channel can be used to communicate control functions between modules within any device. Further information concerning the VI control channel is presented in U.S. Pat. No. 5,027,349 filed on the same date as the present application entitled Embedded Control Technique for Distributed Control Systems, inventor Hal Thorne. This application is hereby incorporated by reference.

Again, the basic nature of the serial transport frame format is shown in FIG. 7. As seen there, sixteen bits comprise each channel of information. There are 32 channels per frame. The first bit of each channel (bit #0) is the most significant (MSB) and the sixteenth bit is the least significant (LSB).

The first eight bits of each channel comprise data (bits D0 through D7) while the remaining bits represent associated control information (bits C0 through C7). The associated control bits may represent any type of control information depending upon the nature of the associated channel data and the needs of the modules interconnected to a serial bus transferring information within this format. This associated control information may comprise address information regarding the channel data, timing information regarding the channel data, data valid and interrupt bits (V and I bits) and parity information regarding the channel. In all situations, the associated control bits represent information respecting the channel data or are "don't care" bits; i.e., bits that convey no particular information regarding the channel data.

Channel zero of each serial transport frame format represents synchronization data and associated control information.

Each serial bus is called a serial link and is identified by a number corresponding to its link number. A serial link conveys information in the serial transport frame format, and thus 32 channels are associated with each serial link.

Channel zero of each link contains synchronization information. Channel one contains the virtual tributary (VT) pointer byte if the SONET floating VT mode is selected (see SONET standard adopted by the American National Standards Institute, Inc. (ANSI) as set forth in standard T1.105 entitle "Digital Hierarchy Optical Interface Rates and Format Specification" which is incorporated hereby by reference). FIG. 8 hereof shows various virtual tributary sizes according to that specification. The VT1.5 size is used in the United States for carrying 24 DS-0 level signals. In other words, within each VT1.5 there will be one 8 bit sample from each of 24 different subscribers. Within a SONET frame there will be 28 different VT1.5's, for example, and therefore similar samples from 672 different subscribers. Each SONET frame takes 125 micro seconds which means it is repeated at a rate of 8,000 hertz and therefore that each of the 672 subscribers is fully sampled within the data transport frame at 64 kbits/sec.

Channel 2 indicates floating VT mode. Channel 3 contains the signalling information. Channels 4–27 contain one DS-0 channel each. Bits 0–7 for each channel contain the voice or data information, while bits 8, 9, 10 and 11 contain the ABCD signalling highway information, respectively. Bit 12 contains the signalling frame synchronization bit and bit 13 contains a bit to indicate twice the signalling frame synchronization frequency. Bits 14 and 15 are not assigned.

Channel 28 is reserved and channels 29 and 30 are not assigned. Channel 31 is used by terminating devices for communication to a system controller. The above described channel layout is good for serial links 0–27. The remaining serial links 28-31 are used for other purposes such as communications with a network manager, etc.

The serial transport frame uses a unique framing pattern for channel 0 for purposes of synchronization. Specifically, the pattern uses bits 1–7 with the following binary values: 0 1 0 0 1 1 1. This code is a 7 bit Barker Code. This code is alternated on even and odd frames with its compliment so as to prevent accidental framing on a repeated steady-state pattern.

A synchronization state diagram has been devised and is shown in U.S. Pat. No. 5,060,229 and is based on the International Consultative Committee for Telephone and Telegraph (CCITT) standard for 32 time slot pulse code modulation (pcm).

The VI channel which can be one or more of the channels of the serial transport frame format, provides the alarm, provisioning and communications channel used between various modules.

Thus what has been described is a serial transport frame format for transferring data between two locations, such that the data is always transferred in channels with associated control information. The associated control information can include signalling information if the data corresponds to telephony information. It can also include, depending upon the nature of the channel data, timing information, valid data information, interrupt information, address information and channel parity information.

One channel per frame contains frame synchronization information used by the interconnected modules to determine whether the serial transport frame format is being accurately received. The serial transport frame format includes a predetermined number of channels per frame, each channel having a predetermined size. The entire frame is transmitted during a predetermined length of time.

In this manner, a flexible and expandable system for defining serial data is presented which facilitates communications between modules such as those used to implement terminal multiplexers, add/drop multiplexers and the like as used in telephony, and in particular as used in telephony associated with a synchronous optical network.

Referring to FIG. 9, there is shown a block diagram of the components found in an optical distribution unit (ODU) 50, which is connected to an optical fiber link 18. An SBI signal on a line or bus 44 provided in a baseband digital data format is passed through a level adjuster 178 and thereafter a lowpass filter 180. The SBI baseband signal from the lowpass filter 180 is connected to an RF multiplexer 182.. A video signal may be provided as well and may be passed through a level adjuster 184 and is thereafter provided to the RF multiplexer 182, where the video signal is frequency division multiplexed with the narrowband SBI baseband digital signal, and the combined signal is provided to a laser driver 186. The amplitudes of the SBI signal and the video signal are set in the level adjusters 178 and 184 prior to multiplexing, in accordance with their respective desired laser modulation depths. The combined multiplexed signal is used to modulate a laser around a set bias level.

The laser driver 186 drives a laser diode contained within an optical transceiver unit 188, which contains all of the optical components of the system. The optical transceiver 188 contains a laser diode 190 which is of the Fabry-Perot type, such as the CQF63 laser provided by Philips. The light emanating from laser diode 190 is provided to an optical coupler/splitter 192 for transmission over the fiber link 18. Light received from the fiber link 18 is provided to the optical coupler/splitter 192 and is directed towards a PIN photodiode 194, which may be similar to photodiode CPF31/D, also supplied by Philips.

Photodiode 194 is connected to a narrowband pre-amplifier 196, which may be a Signetics Model SA5212N Transimpedance Amplifier. The narrowband pre-amplifier amplifies the detected signals to noise-immune levels, after which the signals are provided to a post-amplifier 198, which may be of the type similar to Signetics Model SA5214D Post-Amplifier with a Link Status Indicator. The link status indicator is a power-level monitor to determine if the digital signal strength is sufficient to meet bit error rate requirements. An output of the power level monitor is provided to a low-power alarm 200. The output of post-amplifier 198 is provided to a clock recovery circuit 210, which functions to pass the baseband SBI signal to a line of bus 44, and also to extract from the baseband signal a clock signal which is used to retime the SBI baseband data. If the clock recovery circuit 210 cannot extract a clock signal, or if some failure in coding occurs which prevents phase locking, a loss-of-signal indication is provided to a loss-of-signal alarm 212.

Since laser output power vs. current characteristics change over temperature and lifetime, the laser bias level must be adjusted to maintain a constant optical output power based on feedback techniques. Accordingly, a back-facet monitor photodiode 214 is provided in association with the laser diode 190. The bias level for the laser driver 186 is adjusted by a bias-regulating circuit 216, using the combined inputs of the SBI signal to prevent long-term variations in duty factor of the SBI information from affecting the laser bias level, an input from a thermistor 218, and an input from the video signal. An alarm is generated and provided to a bias alarm 220, if the bias level exceeds a threshold, indicating that the laser has failed or aged beyond reliability limits. The alarm threshold level is normalized over temperature through the use of the thermistor input to compensate for normal bias level increases associated with temperature increases.

Referring to FIG. 10, there is shown a block diagram of the components of the optical fiber link located within an ONU located in a subscriber neighborhood. The components located in ODU 70 are similar to those located in ODU 50; therefore, like components have been given like numerical indicia, and the descriptions of the components will not be repeated. The output of photodiode 194 is connected to a broadband pre-amplifier 222, which is a wideband transimpedance pre-amplifier which is capable of amplifying the photodiode current while introducing little noise, and having a wide bandwidth. The pre-amplifier may be similar to that provided by Anadigics, sold under the name Monolithic GaAs Transimpedance Amp ATA10010D1C. At the output of the pre-amplifier 222, the video signal is tapped off for further processing. The baseband signal is passed through a lowpass filter 224, after which it is provided to a post-amplifier 198.

It should be noted that in FIGS. 9 and 10 there is described a fiber optic link which is adapted to transmit the baseband signals bidirectionally, with only the broadband video signal being passed unidirectionally from a remote terminal to an ONU. It should be apparent that bidirectional video transmission could also be provided if desired, for future enhancements of the system. In such a case, the output of photodiode 194 in FIG. 9 would be connected to circuitry similar to that which is connected to photodiode 194 in FIG. 10, and the circuitry driving the laser diode 190 in FIG. 9 would be used to drive the laser diode 190 in FIG. 10. Thus, the present invention contemplates the provision of bidirectional transmission of both narrowband and broadband data.

The advantages of extending the SBI over fiber are many fold. The SBI payload already supports the Bellcore recommendation for service to an appropriate number of Living Units (LU) to be supported by a residential ONU at a curb site, with 3 DS0s to each of eight LUs. The necessary timing, including sync word and embedded Manchester code are already included in the SBI structure. Channel-associated ABCD signaling for 24 DS0 channels is already implemented in the SBI. Independent, non-aligned TX and RX framing is permitted within the SBI. An interprocessor communication link known as the VI channel is already provided within the SBI system. Performance monitoring, diagnostics and protection switching subsystems are already features of the LCX SBI system. The system further supports a 32-word frame structure that can accommodate a SONET VT-1.5 tributary.

A primary objective of the present invention is to provide for the extension of the baseband SBI in an optical mode along distribution fibers to remotely-located ONUs.

DETAILED DESCRIPTION OF THE PRESENT INVENTION

Figure 1:
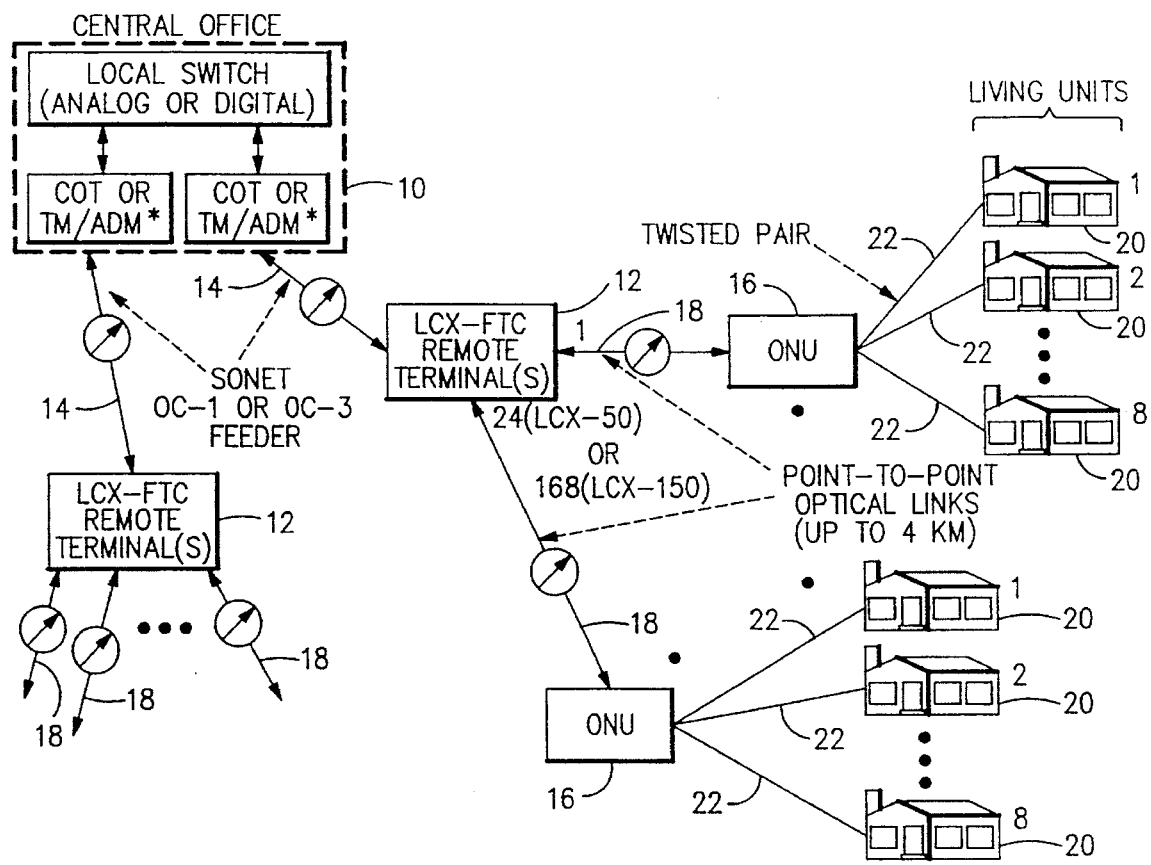
FIG. 1 is a block diagram of a basic narrowband FTC architecture which can be upgraded to provide broadband service.

Referring to FIG. 1 there is shown a CO 10 connected to remote terminals 12 via SONET OC-1 or OC-3 optical feeders 14 which function as a digital transport link therebetween. The carrier rate used for transport depends upon the current and anticipated channel capacity required. The CO 10 may include either an LCX-50 or LCX-150 Central Office Terminal (COT) for UDLC arrangements or a TM-50 or ADM-150 for IDLC arrangements. The UDLC system is suited for COs with an analog switch using metallic line shelves to provide the analog interface to the switch. The IDLC system arrangement provides a DSX-1 interface with TM-50 or ADM-150 units for COs using a digital switch. Both TR-8 and TR-303 digital interfaces are supported by the LCX-FTC system. An LCX-50 core provides the platform for OC-1 rate transmission and an LCX-150 core will provides a platform for OC-3 rate transmission. The structures necessary for the TM-50 and ADM-150 units are similar to those disclosed in the aforementioned U.S. patent application, Ser. No. 351,861 filed May 12, 1989 and the structures for LCX-50and LCX-150 cores are disclosed in U.S. patent application, Ser. No. 452,291, filed Dec. 15, 1989.

The telecommunications system uses a star distribution network where the optical fibers radiate from the RTs 12 to active ONUs 16 via point to point optical distribution links 18. Each LCX-50 equipped RT 12 can serve up to 24 or 28 ONUs, depending on whether broadband service is being offered. The RT serves the ONUs through optical links 18. When the RT is equipped with an LCX-150, 168 ONUs can be served with narrowband and broadband services. Each ONU 16 can service up to eight living units or homes 20 and is connected thereto through the use of metallic twisted pairs or coaxial drops 22 depending on the service required in each living unit. Typically each living unit will be provided with three DS0 channels, two channels for providing (POTS) and a third channel reserved for future applications such as the D-channel for ISDN.

Figure 2:
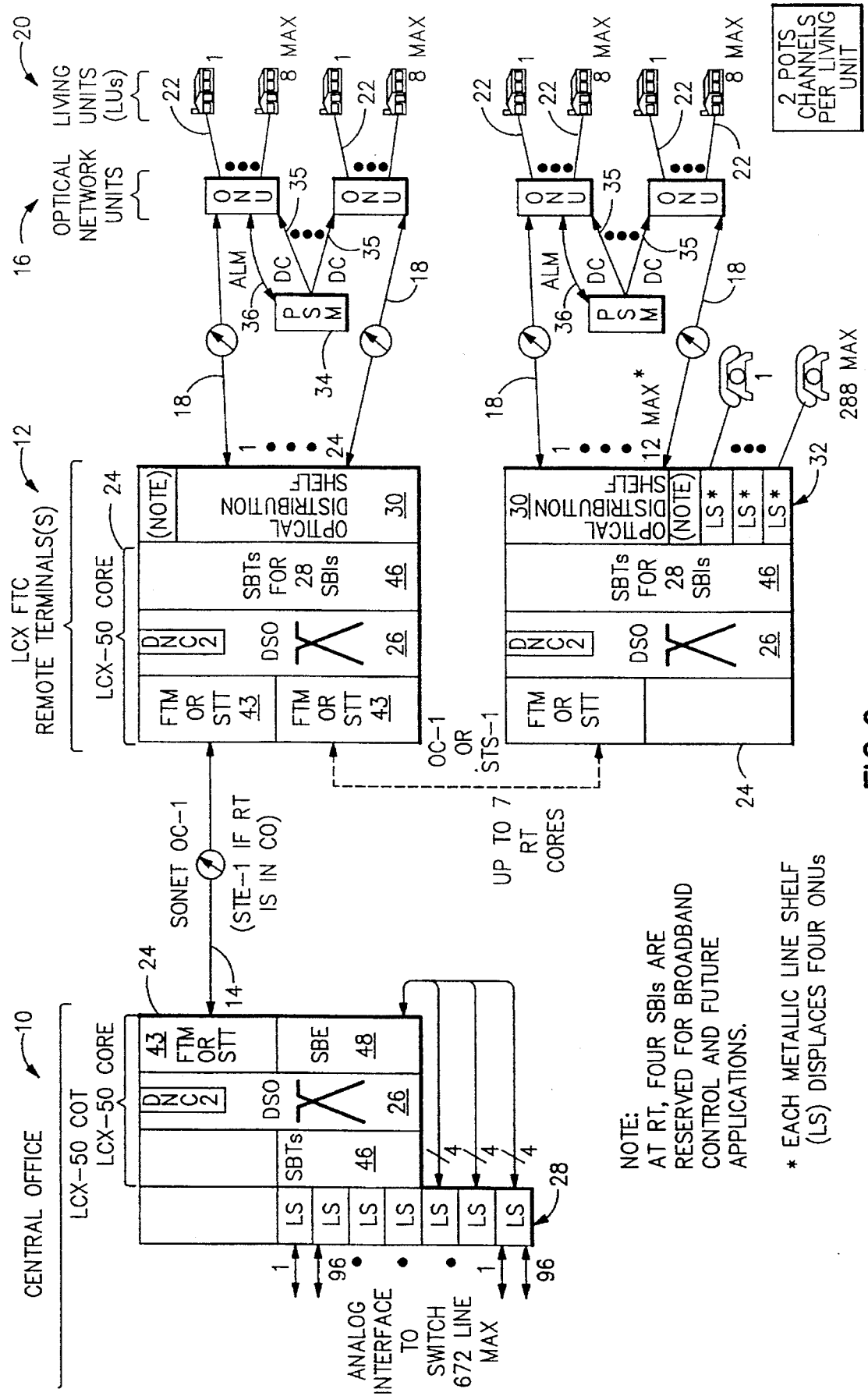
FIG. 2 is a block diagram illustrating one embodiment of the overall system of the present invention.

Referring to FIG. 2 there is shown greater detail of the LCX-50 core 24 as used in the CO 10 and RT 12. The LCX-50 core 24 utilizes a non-blocking switch fabric in the form of a time slot interchanger 26 which allows for switching of the various subscriber channels. In the RT 12 the time slot interchanger 26 allows the subscriber channels from ONUs 16 to be loaded and groomed over the RT to CO feeder 14 for optimum capacity and ease of administration. As shown in FIG. 2 several RT cores 24 can share the same feeder 14 to provide a distributed arrangement for additional flexibility and channel density. The ability of the RT to groom and reassign subscriber channels to different time slots allows more flexibility in the planning and placement of ONUs. The time slot interchanger 26 utilized in the core is constructed as shown in U.S. patent application Ser. No. 295,887 filed Jan. 11, 1989, which is incorporated herein by reference.

The configuration shown in FIG. 2 is adapted for use with a voice-grade analog switch interface and is thus a UDLC system based on a LCX-50 core. It is to be understood that a LCX-50 core can also support a system for use with an IDLC configuration and that the LCX-150 core could be used in an IDLC configuration that provides TR-303 compatibility.

The system shown in FIG. 2 includes a COT in CO 10 and a RT 12 having a plurality of cores 24 connected to the COT via a SONET OC-1 feeder 14. Optical distribution links 18 extend to the ONUs 16. Interface to the analog switch is provided by metallic line shelves 28 which accommodate channel unit plug-ins to perform the analog/digital conversions on the transmission signal and present voice frequency and baseband interfaces to the switching system. Up to seven line shelves 28 can be serviced by an LCX-50 core 24, with each line shelf providing 96 subscriber lines, for a total of 672 lines. When CO 10 is updated to a digital switch providing an integrated TR 303 interface, the LCX-FTC system can easily be upgraded to the new digital switching environment.

In the RT 12, the core 24 is connected to an Optical Distribution Shelf (ODS) 30 which provides the housing for plug-in electronics that provide the fiber optic interfaces to the ONUs. The ODS 30 is used in place of the metallic line shelves 28; however, if some metallic lines are terminated at the RT 12, a number of shelves may be equipped for metallic lines, as shown at 32. However, each metallic line shelf reduces the number of ONUs served by the ODS by four. A fully-equipped ODS has positions for 28 optical interfaces; however, only 24 are used for residential applications.

The residential ONUs 16 are sealed enclosures contemplated for use in a neighborhood right-of-way near the subscriber residence that it serves. The ONU provides electronics that perform the optical/electrical conversions required and also houses channel plug-in units that provide the narrowband interface to the living units. The narrowband channel plug-in units utilized in the ONU are substantially identical to those used in the LCX-50 metallic line shelves.

In many instances, a living unit containing customer premises equipment may be connected directly to the CO 10 without the need of a digital loop carrier system, such as the feeder link between RT 12 and CO 10. In such instances the equivalent of RT 12 would be co-located with the CO equipment. When the RT is co-located in the CO, economical electrical STS-1 connections may be used in place of the optical OC-1 feeder.

In FIG. 2, there is shown a Power Services Module (PSM) 34 associated with groups of ONUs 16. The PSM 34 is a free-standing cabinet designed to provide power to the active elements contained in the ONUs. Alarm connections 36 are also provided between the PSM and an ONU for providing alarm signals back to the RT or CO in the event of a failure in the PSM 34.

It should be noted that up to seven LCX-50 cores 24 may be connected together in one RT site, utilizing OC-1 or STS-1 interconnections. Switched video signals may be provided to the ODS 30 in each LCX-50 core 24.

Figure 3:
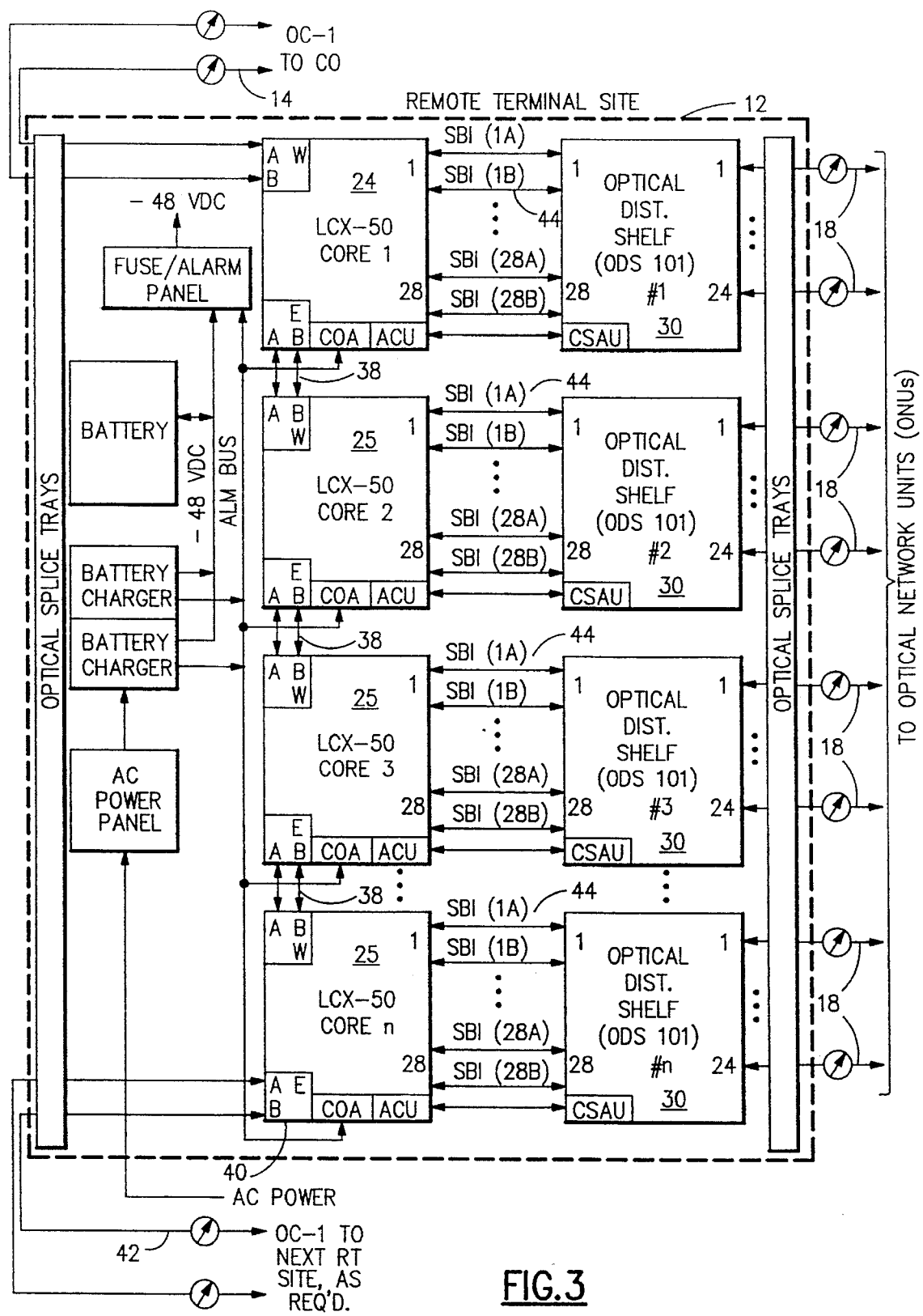
FIG. 3 is a block diagram showing a remote terminal of an LCX-FTC equipped for narrowband service.

FIG. 3 shows an arrangement wherein an OC-1 feeder 14 from the CO 10 is terminated at one LCX RT core 24, with additional LCX RT cores 25 interconnected with electrical STS-1 high-speed links 38. With this type of add-drop arrangement, the timeslots or channels in the OC-1 feeder 14 from the CO can be efficiently utilized, even when the channel capacity of all ONUs is not fully utilized. The last LCX RT core 25 in the add-drop string of cores may be equipped with an FTM-OC1 interface 40 to continue the string of cores to another RT site via another OC-1 feeder 42.

The ODS 30 is responsible for providing an interface between the LCX RT core 24 and the distribution fibers 18 to the ONUs 16. The transport and control connections between the LCX RT cores 24 and 25 and the ODS 30s are via 4 Mb/s balanced serial bus links referred to as Serial Bus Interfaces (SBI) 44. The SBI is an internal electrical bus used in the SONET access products of Alcatel and is fully described in the afore-mentioned U.S. patent application Ser. No. 351,458, filed May 12, 1989, which is incorporated herein by reference. The SBI includes a usable payload of 24 DS0 channels or one DS1 signal. The SBI is uniquely used to supply the distribution fibers 18 for the local loops. The optical signal transmitted over distribution fibers 18 is also at a 4 Mb/s serial data link, and is essentially an optical extension of the SBI.

It should be noted that the OC-1 feeder line 14 is redundant and comprises lines A and B, said redundancy is carried through the LCX-50 core and also in the SBIs 44 which are also shown as A and B SBIs. It should be further noted that in FIG. 2, there are provided fiber optic transceivers (FTM) 43, which may be replaced by STS-1 electrical transceivers (STT) if the feeder line is a limited distance electrical STS-1 line, as opposed to an optical carrier. In addition, the LCX-50 cores include Serial Bus Transceivers (SBT) 46 for interfacing with the SBIs 44. The LCX-50 core 24 located within the CO 10 also includes a Serial Bus Expansion unit (SBE) 48 to facilitate connection to additional line shelves 28.

Figure 4:
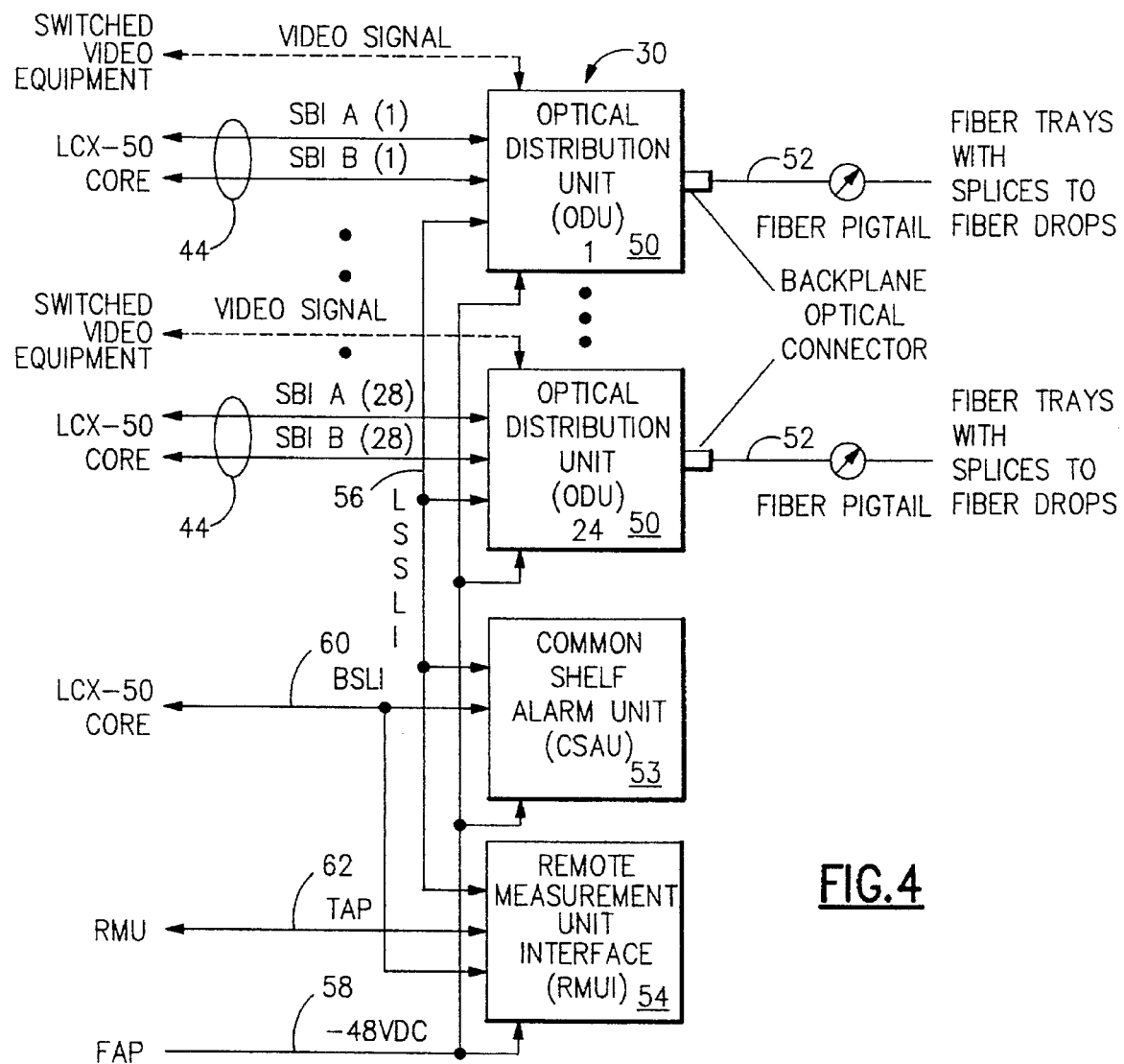
FIG. 4 is a block diagram of an optical distribution shelf as shown in FIG. 3.

Referring to FIG. 4, there is shown greater detail of the ODS 30 used with the cores 24 of the RT 12. The ODS 30 is used in place of a group of metallic line shelves and provides for the optical connection to the ONUs 16. The ODS includes, for residential purposes, 24 Optical Distribution Units (ODU 101) 50, each connected with a fiber pigtail 52 for connection to the distribution fibers 18. Each ODU 50 is connected to the LCX 50 core 24 via a pair of redundant SBIs 44. The ODU 50 essentially performs an electro-optical conversion of the electrical SBI signal to an optical SBI signal. The ODU 50 is also adapted to receive switched video signals from broadband equipment and to Frequency Division Multiplex the video signals with electrical SBI signals, which will be described hereinafter.

Each ODS 30 is further provided with a Common Shelf Alarm Unit (CSAU) 53. A Remote Measurement Unit Interface (RMUI) 54 may be provided in the ODS, only one RMUI is necessary per RT. The components of the ODS 30 are interconnected by a Low-Speed Serial Link Interface (LSSLI) 56 and receive power via a line 58. A Balanced Serial Link Interface (BSLI) 60 connects the CSAU 53 and the RMUI 54 with the LCX-50 core. A line 62 connects the RMUI 54 with the remote measuring unit and functions as a Test Access Path (TAP).

Figure 5:
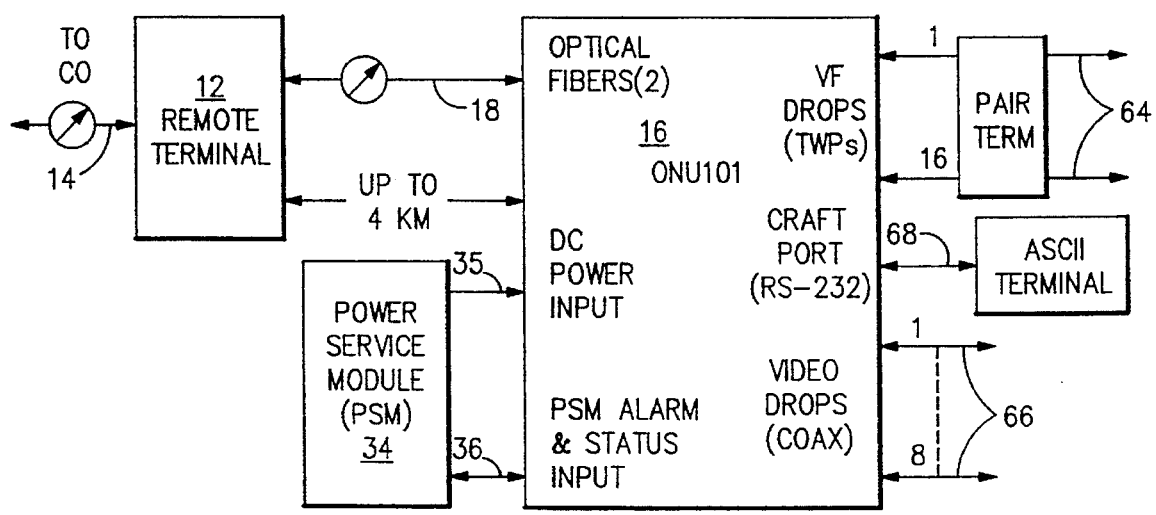
FIG. 5 is a block diagram showing how an ONU fits into the overall system.

Referring to FIG. 5, there are shown details of how an ONU 16 fits into the overall system. Two optical fibers 18, one active and one spare, are received from RT 12. The active fiber carries narrowband and broadband signals, while the spare fiber is provided to carry broadband video service to any additional living unit over four units provided with video service. The narrowband and broadband signals on the active fiber are combined at the RT using Frequency-Division Multiplexing (FDM). The narrowband data occupies the spectrum from 0–50 MHz is reserved for narrowband data, while the broadband signal occupies the spectrum from 60–780 MHz.

The ONU 16 can serve up to eight living units, with three DS0 channels available per living unit. For each living unit, two subscriber drops, typically used for POTS, are available, with the third DS0 channel reserved for future applications, such as the D-channel for ISDN. The POTS subscriber drops are provided at outputs 64 and are represented by 16 twisted wire pairs. The third DS0 channel output is not shown in FIG. 5.

The ONU also provides video coax cable drops 66 for subscriber access to high-quality broadband signals. It is contemplated that a business ONU will provide more channel capacity and services per ONU than the residential ONU shown in FIG. 5. The ONU 16 receives its power from the PSM 34 over line 35 at a nominal voltage of −130 VDC. Line 36 connects the power service module 34 with the ONU 16 to provide PSM alarm and status information. Line 36 is only used between the PSM 34 and one ONU, it is not needed for all ONUs. The ONU is also provided with an output 68 as a craft port for an RS-232 connection. If desired, the −130 VDC power could be provided from a local power source, such as residential power.

Figure 6:
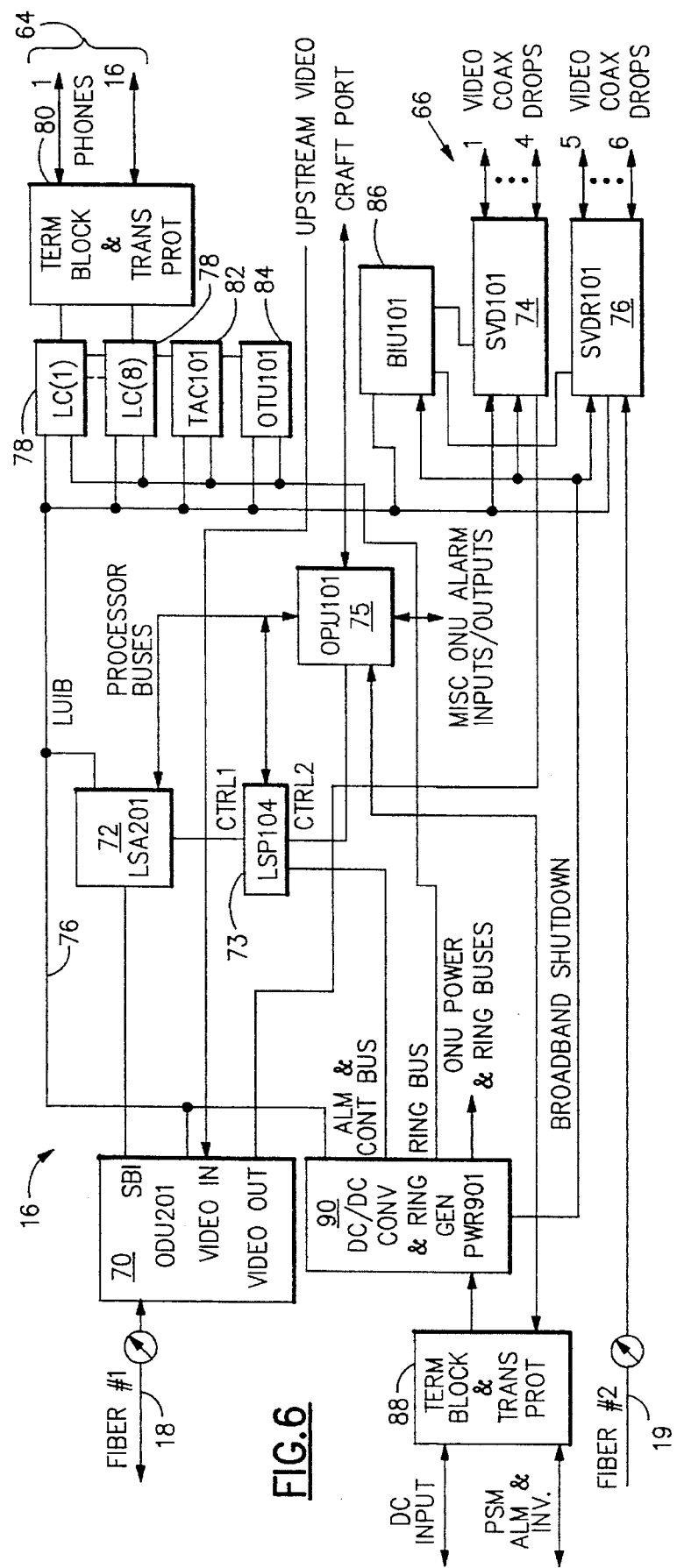
FIG. 6 is a block diagram of an ONU.
Figure 7:
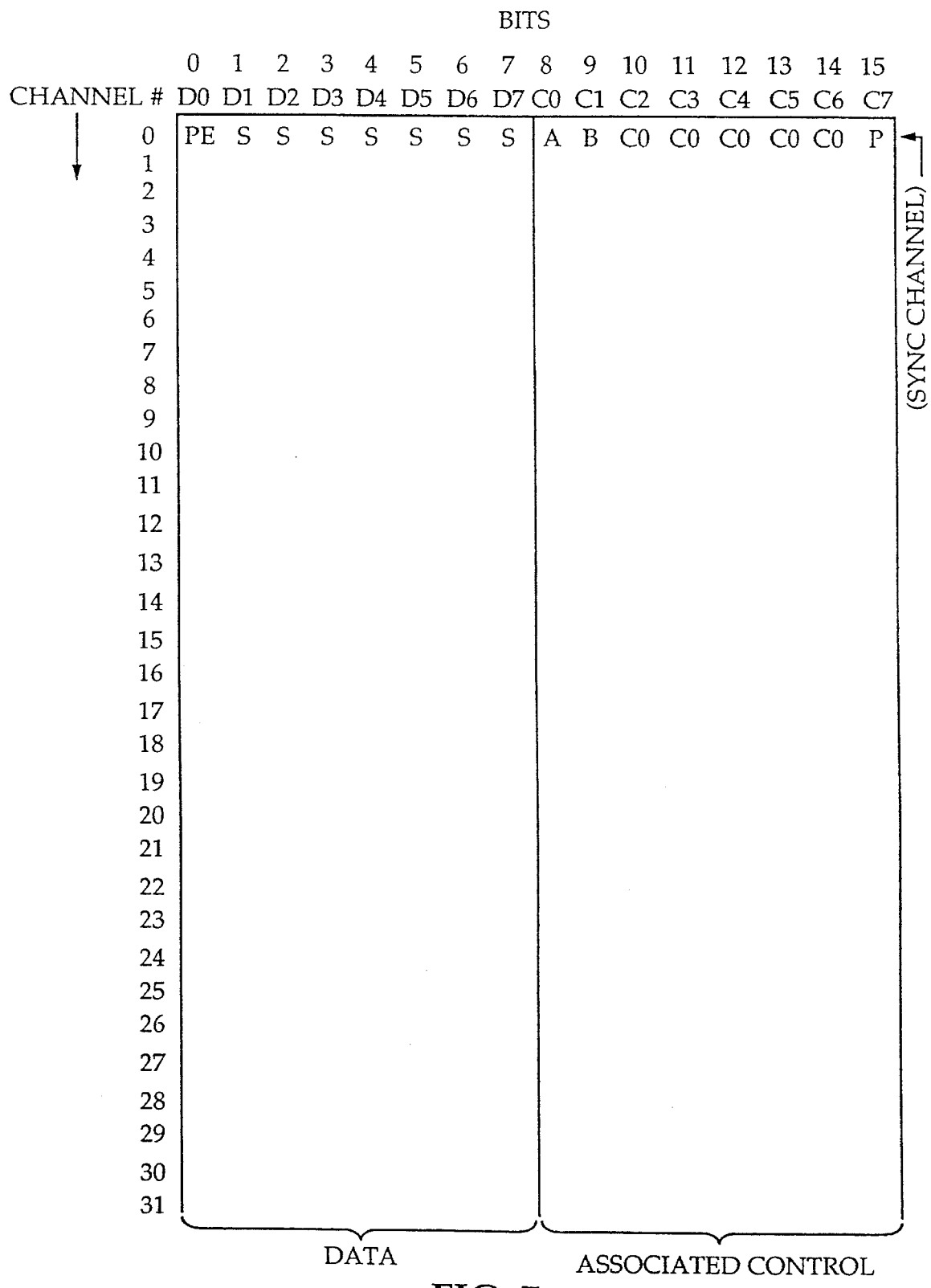
FIG. 7 illustrates a serial transport frame format as first shown in U.S. Pat. No. 5,060,229 in an internal electrical link, now proposed for extension, according to the present invention, into the optical domain.
Figure 8:
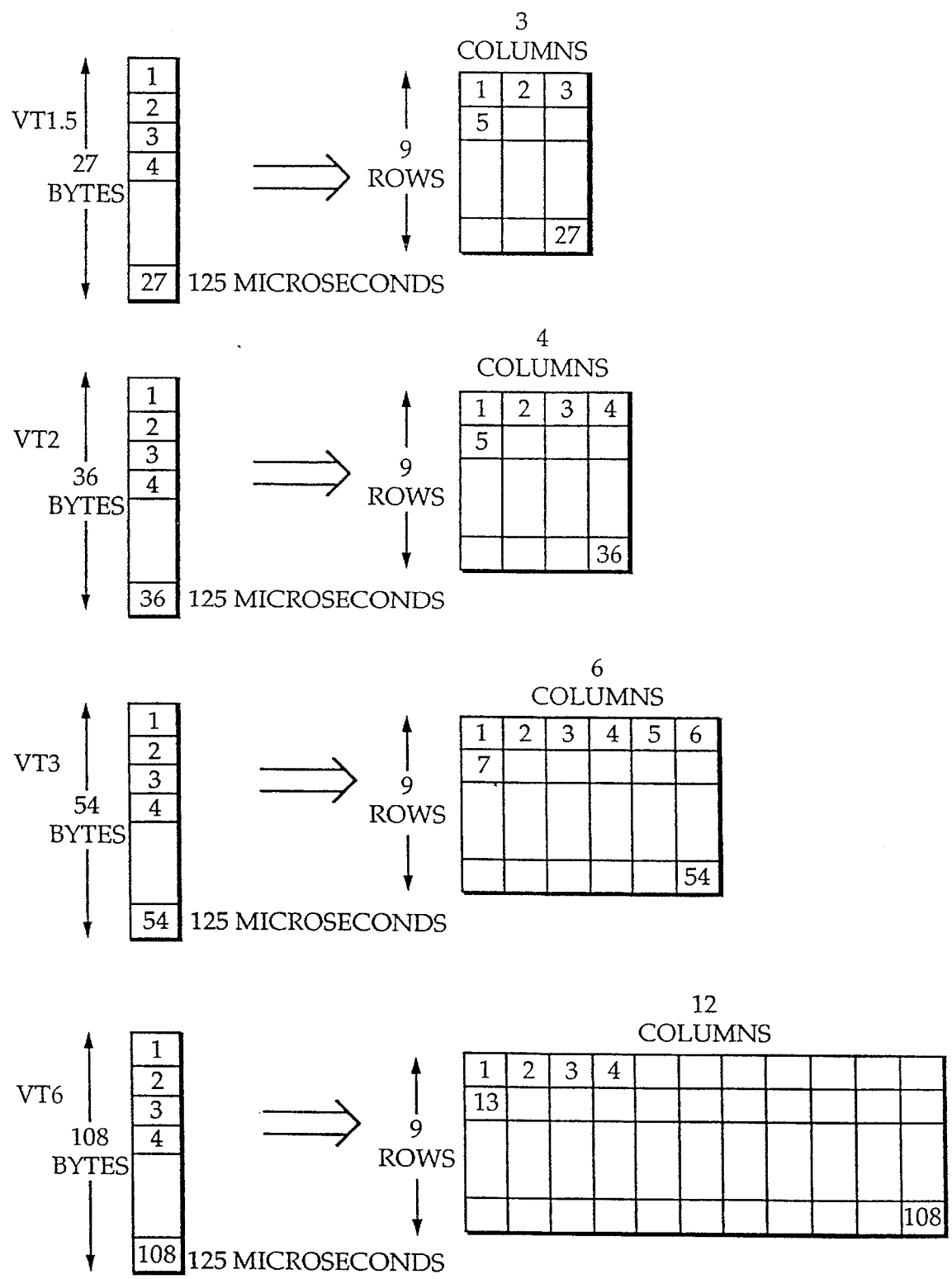
FIG. 8 shows the known virtual tributary structures designed for transport and switching of sub-STS-1 payloads; four different sizes of virtual tributaries are illustrated; in the 9-row structure of the STS-1 synchronous payload envelope, these VTs occupy three columns, four columns, six columns, and twelve columns, respectively.
Figure 9:
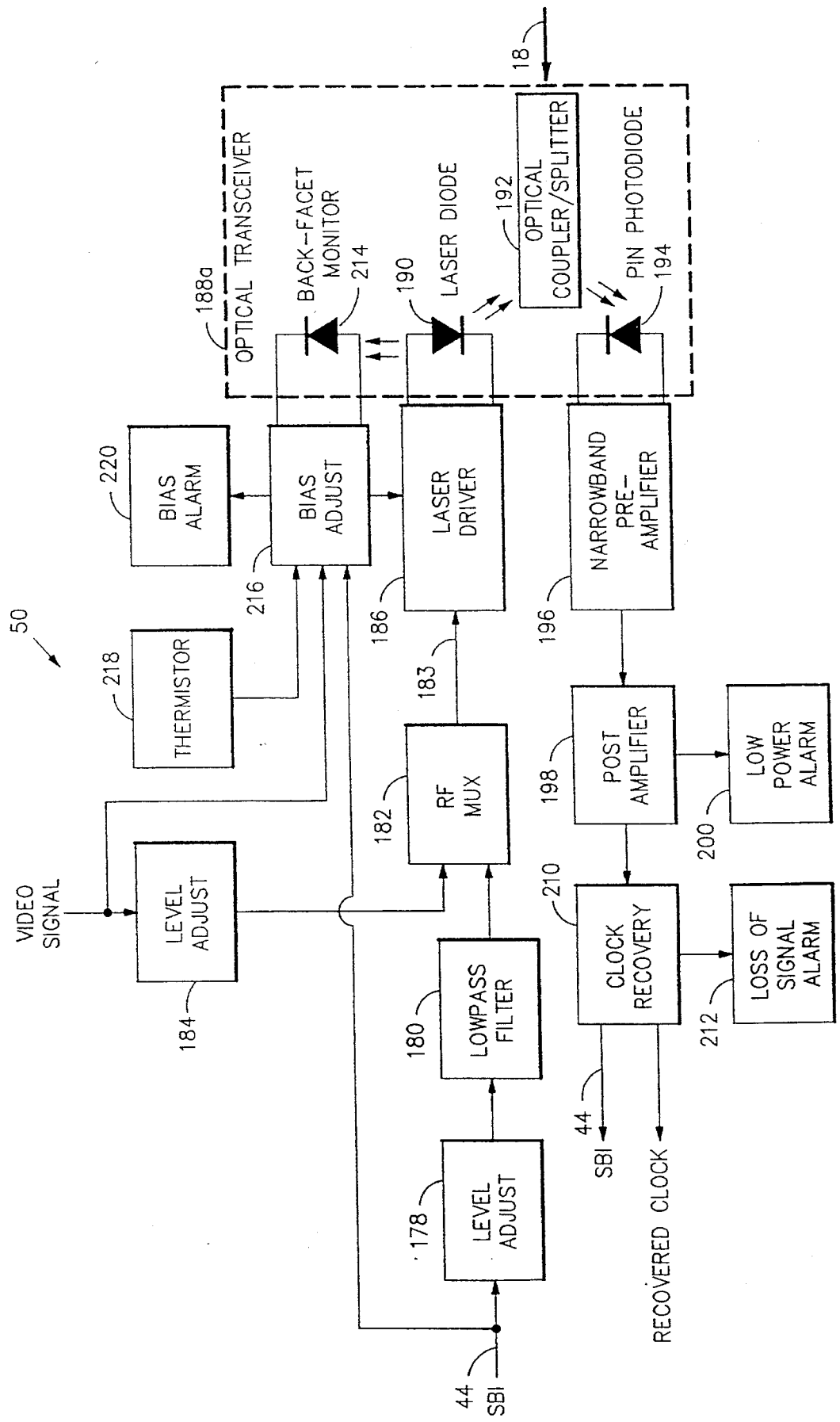
FIG. 9 shows a block diagram of the components found in an optical distribution unit (ODU), which is connected to an optical fiber link, according to the present invention.
Figure 10:
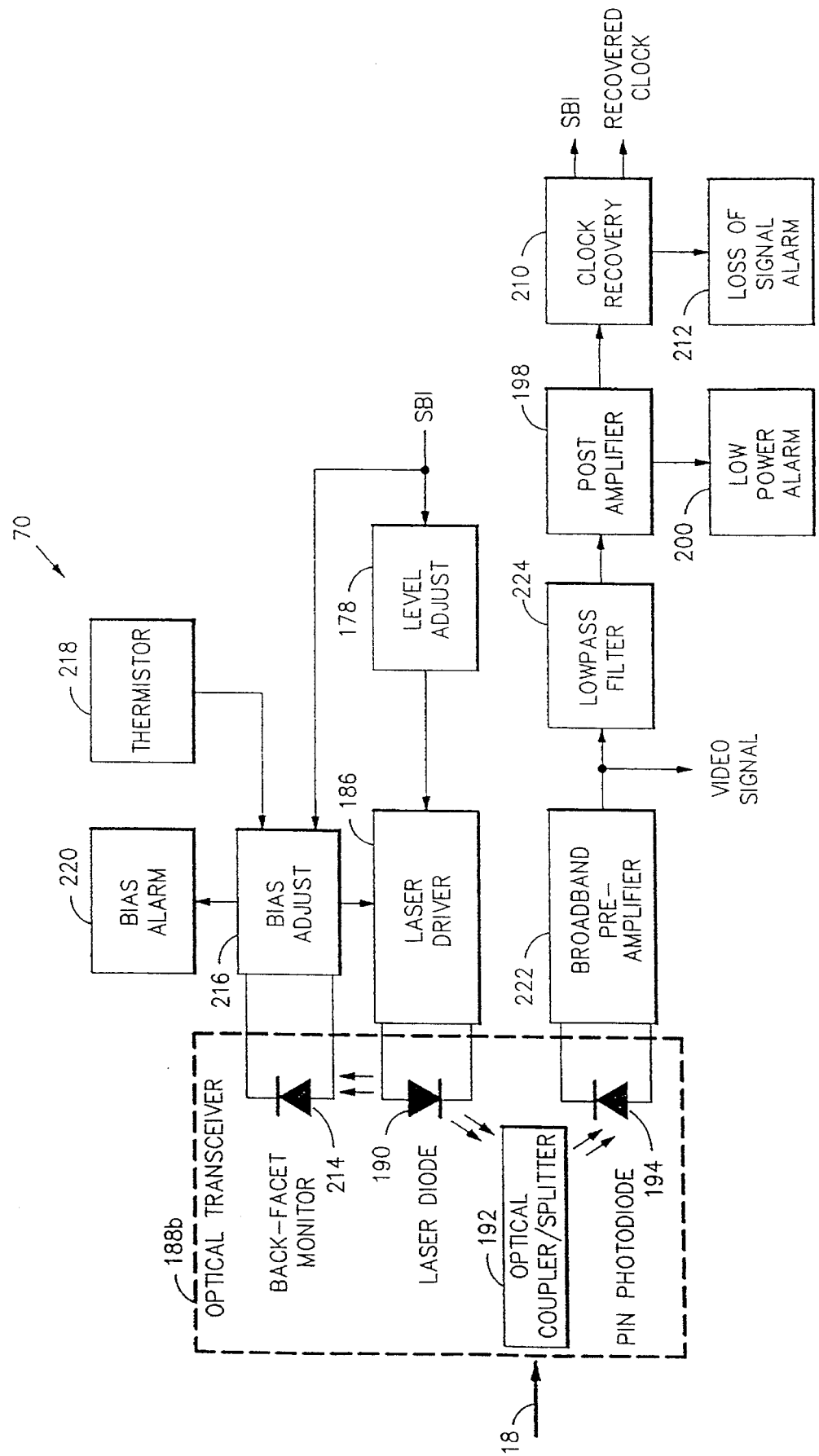
FIG. 10 shows a block diagram of the components of the optical fiber link located within an optical network unit (ONU) located in a subscriber neighborhood.

Referring to FIG. 6, there is shown a more detailed block diagram of an ONU 16. The integrated narrowband and broadband signal is received from the RT 30 over a distribution fiber 18 which is connected to an Optical Distribution Unit (ODU 201) 70. The ODU 70 converts the optical signal to an electrical signal and includes a lowpass filter which separates out the narrowband signal from the integrated signal. The narrowband signal is in the form of an encoded serial bus interface (SBI) data stream, which signal is sent to a Line Shelf Access (LSA) 72 which functions to distribute the signal to various time slots assigned to cards inserted in the line shelf. The broadband video is filtered from the electrical signal and then sent to a Switched Video Distribution (SVD) card 74. The SVD 74 provides video coax drops 66 to four living units 20 requiring video service. When more than four living units are to be serviced with video, a second distribution fiber 19 must be utilized and is connected to a Switched Video Distribution Receiver (SVDR) 76, which provides video coax drops 66 for four additional living units 20.

The ODU 70 has a video input for receiving upstream video from the living units 20.

Many of the components of the ONU 16 are substantially identical to the standard metallic line shelf components utilized in the Alcatel Access Products and are described in the afore-mentioned U.S. Patents and Patent Applications. The LSA 72 is described in U.S. patent application Ser. No. 452,291, filed Dec. 15, 1989, which application also describes the Line Shelf Processor (LSP) 73, said application being incorporated herein by reference. In the present invention, the LSP 73 has additional control functions due to the video distribution handled by the ONU. The LSA 72 is connected to most components of the ONU via a Line Unit Interface Bus (LUIB) 76. The LUIB is described in detail in U.S. patent application Ser. No. 451,436, filed Dec. 15, 1989 and is incorporated herein by reference.

The narrowband metallic DS0 service is provided by line cards 78 which are connected to a terminal block 80 for connection to twisted pairs 64 to be provided to the living units 20. A standard Test Access Unit (TAC) 82 is connected to an ONU Test Unit (OTU) 84 for test purposes. A Broadband Interface Unit (BIU) 86 is provided for controlling the distribution of the broadband signals. A terminal block 88 is provided to receive the DC power input and the alarm information from the PSM 34. Terminal block 88 is connected to a DC/DC converter and ring generator 90 which provides ring signals, alarm and control information.

An ONU Port Unit (OPU) 75 provides an RS-232C craft port for provisioning channel units or to logon to the RT DNC. The OPU collects local ONU alarms and provides an alarm communications interface between the PSM 34 and the CO 10.

Thus, the present invention uniquely extends the baseband SBI of the LCX core to an optical feeder fiber for extending the optical transmission to the neighborhood of the subscribers.

What is claimed is:

1. In an optical fiber communications network having a remote terminal located in a subscriber neighborhood and fed by a high-rate optical fiber signal for providing, at a lower-rate signal interface of the remote terminal, lower-rate signals to various sites in said subscriber neighborhood, wherein the remote terminal includes a cross-connect having a high-rate interface connected to said high-rate optical fiber and having a plurality of internal electrical signal links each having a payload of a selected number of channels connected to said low-rate interface, wherein an improved remote terminal lower-rate interface comprises:

means for directly converting the existing plurality of internal electrical signal links to corresponding optical signals; and means for transmitting the optical signals along corresponding distribution fibers to corresponding optical network units located at said various sites in said subscriber neighborhood.

2. An improvement described in claim 1, wherein the selected number of channels can accommodate a selected SONET virtual tributary.

3. An improvement as described in claim 2, wherein at least one of the channels of the internal link accommodates a sync word.

4. An improvement as described in claim 3, wherein each channel includes channel-associated ABCD signaling.

5. The improved optical fiber communications network of claim 1, wherein each of said existing plurality of internal electrical signal links comprises a serial transport frame format, each frame generated at a frequency of four megahertz.

* * * * *